(12) United States Patent
Parker

(10) Patent No.: US 7,322,584 B1
(45) Date of Patent: Jan. 29, 2008

(54) PEDESTRIAN TRAILER

(76) Inventor: George C. Parker, P.O. Box 268, McCloud, CA (US) 96507

( * ) Notice: Subject to any disclaimer, the term of this patent is extended or adjusted under 35 U.S.C. 154(b) by 175 days.

(21) Appl. No.: 11/191,753

(22) Filed: Jul. 27, 2005

(51) Int. Cl.
*B62B 1/00* (2006.01)
*B62B 7/02* (2006.01)
*B62B 9/00* (2006.01)
*B62B 7/00* (2006.01)
*B60D 1/155* (2006.01)

(52) U.S. Cl. .............. 280/47.131; 280/47.3; 280/47.32; 280/47.33; 280/416; 280/491.2; 280/656

(58) Field of Classification Search ........... 280/47, 280/131, 47.3, 47.32, 47.33, 416, 656, 491.2
See application file for complete search history.

(56) References Cited

U.S. PATENT DOCUMENTS

| | | | |
|---|---|---|---|
| 2,613,953 A | 10/1952 | Giovannoni | |
| 3,907,325 A * | 9/1975 | Gaines et al. | 280/657 |
| 4,045,040 A | 8/1977 | Fails | |
| 4,071,257 A * | 1/1978 | Discount | 280/63 |
| 4,095,815 A * | 6/1978 | Mitchell | 280/63 |
| 4,135,730 A * | 1/1979 | Yunick | 280/65 |
| 4,236,723 A | 12/1980 | Lemmon | |
| 4,368,835 A | 1/1983 | Murphy | |
| 4,369,982 A * | 1/1983 | Hein et al. | 280/47.131 |
| 4,664,395 A * | 5/1987 | McCoy | 280/1.5 |
| 5,005,844 A | 4/1991 | Douglas et al. | |
| 5,215,318 A | 6/1993 | Capraro | |
| 5,265,891 A | 11/1993 | Diehl | |
| 5,385,355 A | 1/1995 | Hoffman | |
| 5,511,802 A | 4/1996 | Aitken | |
| 5,626,271 A | 5/1997 | Messey et al. | |
| 5,769,431 A | 6/1998 | Cordova | |
| 5,791,670 A | 8/1998 | Hunker | |
| 6,039,333 A | 3/2000 | Hamblin | |
| 6,139,033 A | 10/2000 | Western | |
| 6,357,063 B1 * | 3/2002 | Selby | 5/81.1 R |
| 6,431,556 B1 * | 8/2002 | Beardsley et al. | 280/1.5 |
| 6,561,529 B2 | 5/2003 | Darling, III | |
| 2004/0150151 A1 | 8/2004 | Cepull | |
| 2004/0183263 A1* | 9/2004 | Joncourt | 280/1.5 |
| 2004/0231940 A1 | 11/2004 | Nykoluk | |

* cited by examiner

*Primary Examiner*—Christopher P. Ellis
*Assistant Examiner*—John R. Olszewski
(74) *Attorney, Agent, or Firm*—Gerald D. Haynes; R. Keith Harrison

(57) ABSTRACT

A pedestrian trailer is disclosed. The pedestrian trailer includes a trailer frame for supporting a load and at least one wheel which renders the trailer frame portable. A load-stabilizing towing belt may be worn by a pedestrian and removably engage the trailer frame as he or she pulls or tows the pedestrian trailer.

20 Claims, 2 Drawing Sheets

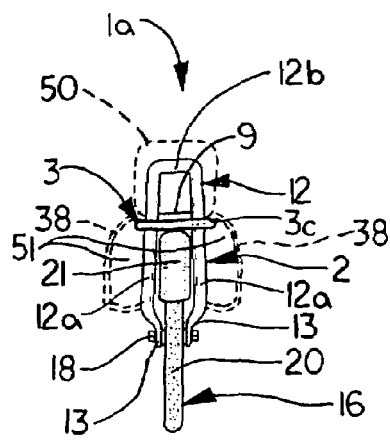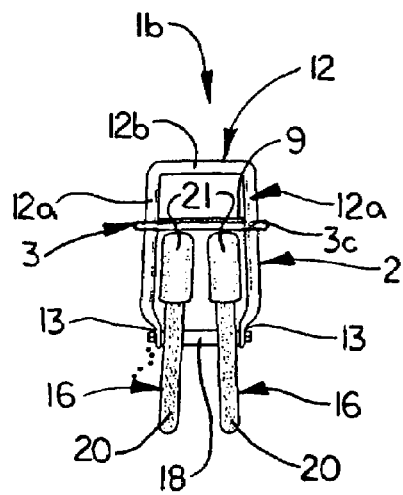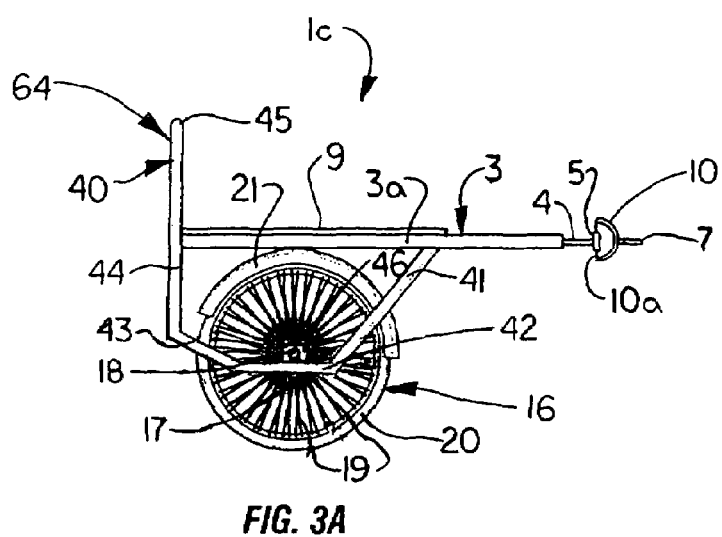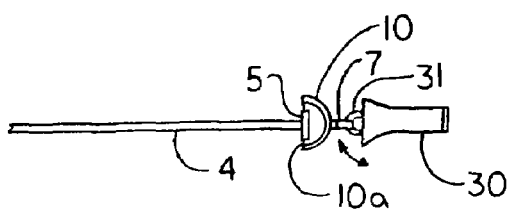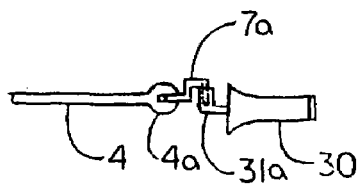
FIG. 2
FIG. 3
FIG. 3A
FIG. 4
FIG. 5

PEDESTRIAN TRAILER

FIELD OF THE INVENTION

The present invention relates to wheeled trailers which support a load and can be pulled or towed by a pedestrian. More particularly, the present invention relates to a pedestrian trailer which is lightweight and enables a pedestrian to easily pull a load while camping or hiking, for example.

BACKGROUND OF THE INVENTION

Various outdoor pursuits such as hiking and camping, for example, frequently require that participants carry a load, typically in a backpack. The backpack may contain various hiking and/or camping gear such as a tent, food, clothing and the like which is necessary or desirable for the sustenance and comfort of the hiker or camper. However, for some persons, such as those who suffer back and/or joint problems, backpacks are uncomfortable to carry. Therefore, a lightweight pedestrian trailer is needed which is capable of carrying a sizable load and can be comfortably towed by a pedestrian when engaged in an outdoor pursuit such as hiking or camping, for example.

SUMMARY OF THE INVENTION

The present invention is generally directed to a pedestrian trailer. The pedestrian trailer includes a trailer frame for supporting a load and at least one wheel which renders the trailer frame portable. A load-stabilizing towing belt may be worn by a pedestrian and removably engage the trailer frame as he or she pulls or tows the pedestrian trailer.

BRIEF DESCRIPTION OF THE DRAWINGS

The invention will now be described, by way of example, with reference to the accompanying drawings, in which:

FIG. 2 is a rear view of another illustrative embodiment of the pedestrian trailer according to the present invention, illustrating multiple pockets provided on the pedestrian trailer for carrying various items;

FIG. 3 is a rear view of a dual-wheel embodiment of the pedestrian trailer;

FIG. 3A is a side view of still another embodiment of the pedestrian trailer, more particularly illustrating an alternative trailer frame configuration for the pedestrian trailer;

FIG. 4 is a side view of an illustrative attachment arrangement for removably and pivotally attaching the pedestrian trailer to a load-stabilizing towing belt to be worn by a pedestrian; and FIG. 5 is a side view of an alternative attachment arrangement for removably and pivotally attaching the pedestrian trailer to a load-stabilizing towing belt.

DETAILED DESCRIPTION OF THE INVENTION

Figure 1A:
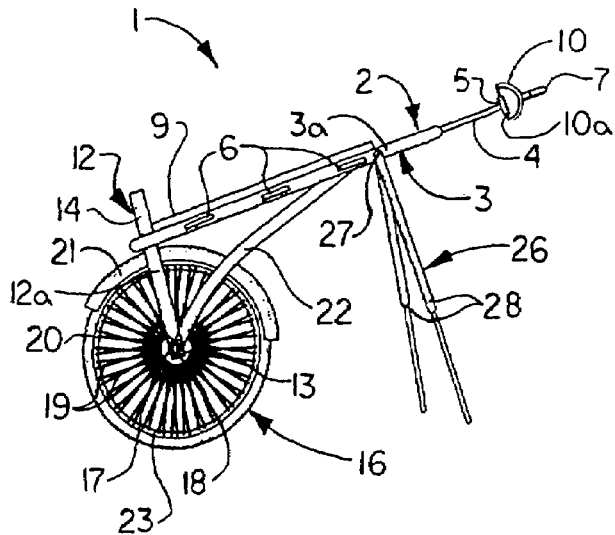
FIG. 1A is a side view of an illustrative embodiment of the pedestrian trailer according to the present invention, with a kickstand of the pedestrian trailer deployed in a trailer-supporting position when the pedestrian trailer is not being towed.
Figure 1B:
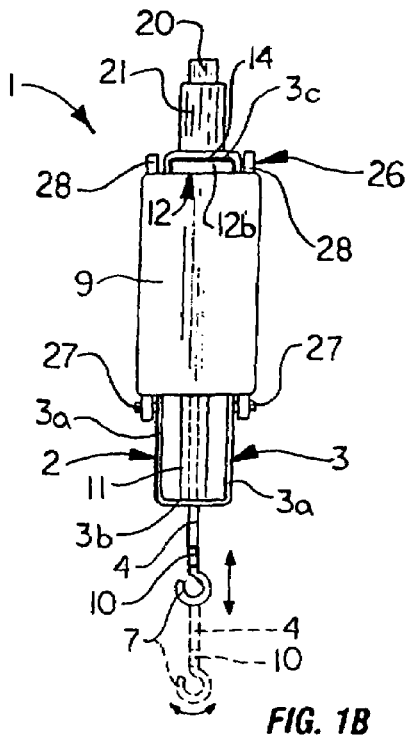
FIG. 1B is a top view of the pedestrian trailer illustrated in FIG. 1, with the kickstand deployed in a storage or non-supporting position.

Referring initially to FIGS. 1A-1D, 4 and 5 of the drawings, an illustrative embodiment of the pedestrian trailer according to the present invention is generally indicated by reference numeral 1. The pedestrian trailer 1 includes a trailer frame 2 which may be a lightweight metal such as aluminum or may be steel or any suitable alternative metal or material. The trailer frame 2 may have a generally L-shaped configuration and include an elongated, generally rectangular top frame member 3 which, as shown in FIG. 1B, may include a pair of generally elongated, parallel side frame bars 3a and a front frame bar 3b and a rear frame bar 3c spanning opposite ends of the side frame bars 3a. However, the top frame member 3 may have alternative shapes and configurations which are consistent with the functional requirements of the pedestrian trailer 1.

The trailer frame 2 typically further includes a wheel mount frame member 12 which is welded or otherwise attached to the rear frame bar 3c and extends between the side frame bars 3a of the top frame member 3. As shown in FIG. 1D, the wheel mount frame member 12 may have a generally inverted U-shape and typically includes a pair of elongated, parallel, spaced-apart side frame bars 12a connected by a cross bar 12b. The wheel mount frame member 12 is disposed in generally perpendicular relationship to the longitudinal axis of the top frame member 3 of the trailer frame 2. The lower ends of the wheel mount frame member 12 terminate in a pair of spaced-apart axle mount flanges 13. As illustrated in FIG. 1A, an extended portion 14 of the wheel mount frame member 12 preferably extends upwardly beyond the plane of the top frame member 3 of the trailer frame 2.

A wheel 16 is rotatably mounted on the wheel mount frame member 12 of the trailer frame 2. The wheel 16 typically includes a wheel axle 18 which is mounted between the axle mount flanges 13 of the wheel mount frame member 12; a wheel hub 17 mounted on the wheel axle 18; a wheel rim 23 on which is mounted a tire 20, which may be pneumatic; and spokes 19 extending between the wheel hub 17 and the wheel rim 23. A pair of frame braces 22 (one of which is shown in FIG. 1A) may extend from the respective axle mount flanges 13 of the wheel mount frame member 12 and terminate on the respective side frame bars 3a of the top frame member 3, to which the frame braces 22 are welded or otherwise attached. A generally arcuate fender 21 may be mounted between the side frame bars 12a of the wheel mount frame member 12 and/or the frame braces 22 to cover the upper curvature of the wheel 16.

Figure 1C:
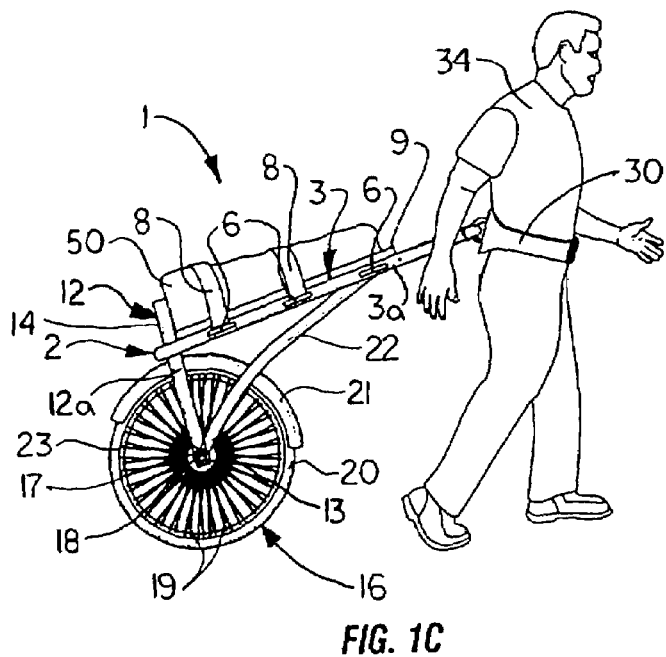
FIG. 1C is a side view of the pedestrian trailer being towed by a pedestrian, with the kickstand removed for clarity.
Figure 1D:
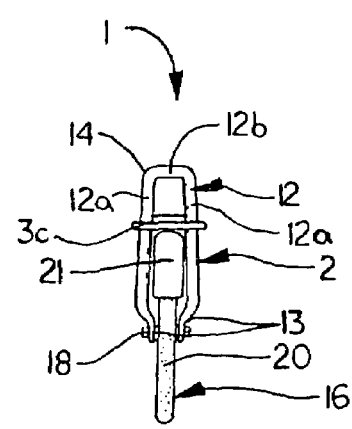
FIG. 1D is a rear view of the pedestrian trailer.

As illustrated in FIGS. 1A and 1C, multiple strap loops 6 may extend from each side frame bar 3a of the top frame member 3, in spaced-apart relationship to each other. A platform 9, which may have a generally elongated, rectangular configuration, as illustrated in FIG. 1B, is mounted on the top frame member 3 of the trailer frame 2. The rear end of the platform 9 may abut against the extended portion 14 of the wheel mount frame member 12. As illustrated in FIG. 1C, in typical use of the pedestrian trailer 1 as will be hereinafter described, a load 50 can be placed on the platform 9 and one or multiple straps 8 extended over the load 50, through the strap loops 6 and fastened to secure the load 50 on the platform 9. However, it will be recognized and understood that the load 50 can additionally or alternatively be fastened to the platform 9 using any suitable technique known to those skilled in the art.

An elongated belt attachment shaft 4 may be provided on the trailer frame 2. Preferably, a selected length of the belt attachment shaft 4 may be selectively extendible from the trailer frame 2. For example, the belt attachment shaft 4 may be selectively and slidably or telescopically extendable from a belt attachment receptacle 11 that is provided on the trailer frame 2. A pin (not illustrated) may be inserted through registering pin openings (not illustrated) provided in the belt attachment receptacle 11 and belt attachment shaft 4, for example, to secure a selected length of the belt attachment shaft 4 in an extended configuration from the belt attachment receptacle 11. Alternative locking mechanisms known by those skilled in the art may be used to lock the belt attachment shaft 4 with respect to the trailer frame 2.

In one embodiment of the invention which is illustrated in FIGS. 1A, 1B and 4 of the drawings, a socket 5 is provided on the distal or extending end of the belt attachment shaft 4. A pivot bracket 10, which may have a generally semicircular configuration, is provided with a pair of pivot pins 10a which extend toward each other. The pivot pins 10a are inserted in the respective ends of the socket 5 to pivotally mount the pivot bracket 10 on the socket 5. A belt attachment hook 7 extends forwardly from the pivot bracket 10. Accordingly, as indicated by the double-headed curved arrow in FIG. 1B, the belt attachment hook 7 is capable of being pivoted in a generally horizontal plane or side-to-side motion as the pivot bracket 10 pivots with respect to the socket 5.

As illustrated in FIG. 1C, a load-stabilizing towing belt 30 is adapted to be worn around the waist of a pedestrian 34. As illustrated in FIG. 4, a hook receptacle 31 is provided on the rear surface of the load-stabilizing towing belt 30 for detachably engaging the belt attachment hook 7. Accordingly, the pedestrian trailer 1 is adapted to be towed by the pedestrian 34 as the pedestrian 34 wears the load-stabilizing towing belt 30 while the belt attachment hook 7 engages the hook receptacle 31. The belt attachment hook 7 is capable of pivoting in a generally vertical plane or up-and-down motion with respect to the hook receptacle 31 of the load-stabilizing towing belt 30.

As illustrated in FIG. 5, in an alternative embodiment of the invention, a shaft eye 4a is provided on the distal or extending end of the belt attachment shaft 4. A belt attachment hook 7a is pivotally attached to the shaft eye 4a such that the belt attachment hook 7a is capable of pivoting in a generally vertical plane or up-and-down motion with respect to the shaft eye 4a. A hook receptacle 31a extends from the rear surface of the load-stabilizing towing belt 30. The belt attachment hook 7a is adapted to detachably and pivotally engage the hook receptacle 31a in such a manner that the hook receptacle 31a is capable of pivoting in a generally horizontal plane or side-to-side motion with respect to the belt attachment hook 7a.

A kickstand 26 may be provided on the trailer frame 2. The kickstand 26 may include a pair of kickstand legs 28 which are pivotally attached to the respective side frame bars 3a of the top frame member 3 typically using pivot bolts 27, as illustrated in FIG. 1B. Accordingly, the kickstand 26 can be selectively deployed in a downwardly-extended, supporting position, as illustrated in FIG. 1A, when the pedestrian trailer 1 is not being towed, to support the pedestrian trailer 1 in a self-standing position on the ground (not illustrated) or other supporting surface. The kickstand 26 can be selectively pivoted from the downwardly-extended, supporting position illustrated in FIG. 1A to a retracted position illustrated in FIG. 1B, in which the kickstand legs 28 extend on opposite sides of the trailer frame 2 and beneath the platform 9, when towing of the pedestrian trailer 1 is desired.

Referring to FIG. 1C of the drawings, in typical use of the pedestrian trailer 1, a load 50 is initially secured on the platform 9 by placing the load 50 on the platform 9, typically extending the strap or straps 8 over the load 50 and through the strap loops 6, and then fastening and tightening the strap or straps 8. The load 50 may include provisions for a hiking or camping expedition, such as food, clothing and/or a tent and other hiking or camping equipment, for example. The load-stabilizing towing belt 30 is fastened around the waist of a pedestrian 34, with the hook receptacle 31 extending from the rear surface of the load-stabilizing towing belt 30. The belt attachment hook 7 on the trailer frame 2 is then attached to the hook receptacle 31 on the load-stabilizing towing belt 30. With the kickstand 26 in the raised, non-supporting position of FIG. 1B, the pedestrian 34 then tows the pedestrian trailer 1 by walking forwardly as the wheel 16 rolls on the ground (not illustrated) and the trailer frame 2 and load 50 thereon travel on the rolling wheel 16. It will be appreciated that the belt attachment shaft 4 is capable of pivoting in a side-to-side motion or horizontal plane with respect to the belt attachment hook 7, whereas the load-stabilizing towing belt 30 is capable of pivoting in an up-and-down motion or vertical plane with respect to the belt attachment hook 7.

Upon arrival of the pedestrian 34 and the towed pedestrian trailer 1 at a desired destination, the pedestrian trailer 1 is detached from the load-stabilizing towing belt 30 by unfastening the belt attachment hook 7 on the trailer frame 2 from the hook receptacle 31 of the load-stabilizing towing belt 30. The pedestrian trailer 1 can then be deployed in the self-standing position by pivoting the kickstand 26 from the upper position illustrated in FIG. 1B to the lowered, supporting position illustrated in FIG. 1A. This facilitates removal of the load 50 from the platform 9 typically by unfastening and removing the strap or straps 8 from the strap loops 6 and removing the load 50 from the trailer frame 2.

Referring next to FIG. 2 of the drawings, another embodiment of the pedestrian trailer 1a includes at least one, and preferably, a pair of pockets 38 (shown in phantom) provided on one or both sides of the trailer frame 2. Each of the pockets 38 is adapted to hold a load 51 in addition to the load 50 which is carried on the platform 1 as was heretofore described with respect to the pedestrian trailer 1 shown in FIGS. 1A-1D.

Referring next to FIG. 3 of the drawings, still another embodiment of the pedestrian trailer 1b includes a pair of wheels 16 which are mounted adjacent to each other typically on a common wheel axle 18. A pair of fenders 21 may be mounted on the trailer frame 2, over the upper curvatures of the respective wheels 16.

Referring next to FIG. 3A of the drawings, yet another embodiment of the pedestrian trailer 1c according to the present invention has a modified trailer frame 64. The trailer frame 64 includes a top frame member 3 which may be similar in construction to the top frame member 3 of the trailer frame 2 on the pedestrian trailer 1 which was heretofore described with respect to FIGS. 1A-1D. A pair of wheel mount frame members 40 is provided in adjacent, spaced-apart relationship to each other on the respective side frame bars 3a of the top frame member 3. Each wheel mount frame member 40 typically includes a front frame segment 41 which angles downwardly and rearwardly from the bottom surface of the corresponding top frame member 3, a generally horizontal axle mount segment 42 which extends rearwardly at an obtuse angle from the front frame segment 41, a connecting frame segment 43 which extends upwardly at an obtuse angle from the axle mount segment 42, and a rear frame segment 44 which extends upwardly from the connecting frame segment 43. An axle bracket 46 typically extends upwardly from the axle mount segment 42 of each wheel mount frame member 40. The rear end of the top frame member 3 may be welded or otherwise attached to the rear frame segments 44 of the respective wheel mount frame members 40. Preferably, each rear frame segment 44 has an extended portion 45 which extends beyond the plane of the top frame member 3. The wheel axle 18, which mounts a wheel or wheels 16 to the trailer frame 64, is typically attached to the axle brackets 46 on the axle mount segments 42 of the respective wheel mount frame members 40. A generally arcuate fender 21 may be provided on the top frame member and/or each wheel mount frame member 40 to cover the upper curvature of each wheel 16. A platform 9 is typically provided on the top frame member 3. The axle brackets 46 of the wheel mount frame members 40 impart a low center of gravity to the trailer frame 64.

It is to be understood that the features of any of the embodiments of the pedestrian trailer heretofore described may be combined with any of the other embodiments of the pedestrian trailer. For example, the pockets 38 which were heretofore described with respect to the pedestrian trailer 1a of FIG. 2 may be combined with the pedestrian trailer 1c in FIG. 3A. Additionally, rather than having one wheel 16, the pedestrian trailer 1c of FIG. 3A may be fitted with two adjacent wheels 16 as was heretofore described with respect to the pedestrian trailer 1b of FIG. 3.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A pedestrian trailer comprising:
   a trailer frame having a generally elongated, continuously planar top frame member and a wheel mount frame member disposed in generally perpendicular relationship to said top frame member and crossing said top frame member such that the wheel mount frame member extends beyond the top frame member;
   at least one wheel carried by said wheel mount frame member of said trailer frame; and
   a load-stabilizing towing belt removably engaging said trailer frame.

2. The pedestrian trailer of claim 1 further comprising a kickstand carried by said trailer frame.

3. The pedestrian trailer of claim 1 further comprising a platform carried by said top frame member of said trailer frame.

4. The pedestrian trailer of claim 3 further comprising a plurality of strap loops carried by said trailer frame.

5. The pedestrian trailer of claim 1 wherein said at least one wheel comprises a pair of wheels carried by said trailer frame in adjacent, spaced-apart relationship to each other.

6. The pedestrian trailer of claim 1 further comprising at least one pocket carried by said trailer frame.

7. The pedestrian trailer of claim 6 wherein said at least one pocket comprises a pair of pockets provided on opposite sides of said trailer frame.

8. The pedestrian trailer of claim 1 further comprising a belt attachment hook carried by said trailer frame and a hook receptacle carried by said load-stabilizing towing belt and removably engaging said belt attachment hook.

9. The pedestrian trailer of claim 1 wherein said wheel mount frame member comprises a pair of generally elongated, spaced-apart side frame bars carried by said top frame member and a cross bar extending between said side frame bars.

10. The pedestrian trailer of claim 1 further comprising a pair of frame braces extending between said top frame member and said wheel mount frame member.

11. The pedestrian trailer of claim 10 wherein said pair of frame braces each has a generally curved shape.

12. The pedestrian trailer of claim 1 further comprising a fender carried by said trailer frame adjacent to said at least one wheel.

13. A pedestrian trailer comprising:
   a generally L-shaped trailer frame having a generally elongated, continuously planar top frame member having a front distal end and a rear distal end and a generally U-shaped wheel mount frame member extending through and disposed in generally perpendicular relationship to said top frame member and intersecting said top frame member at said rear distal end of said top frame member;
   at least one wheel carried by said wheel mount frame member of said trailer frame; and
   a load-stabilizing towing belt removably engaging said trailer frame.

14. The pedestrian trailer of claim 13 further comprising a kickstand carried by said trailer frame.

15. The pedestrian trailer of claim 13 further comprising a platform carried by said trailer frame.

16. The pedestrian trailer of claim 13 further comprising a plurality of strap loops extending outwardly from said trailer frame.

17. The pedestrian trailer of claim 13 further comprising at least one pocket carried by said trailer frame.

18. A pedestrian trailer comprising:
   a trailer frame having a generally elongated, continuously planar top frame member and a wheel mount frame member having a generally U-shaped configuration disposed in generally perpendicular relationship to said top frame member, with an extended portion of said wheel mount frame member extending beyond said top frame member;
   wherein said top frame member includes a pair of generally elongated parallel side frame bars and a front frame bar and a rear frame bar extending between said pair of side frame bars;
   wherein said wheel mount frame member extends between said side frame bars at said rear frame bar of said top frame member and intersects said top frame member;
   a platform carried by said top frame member adjacent to said extended portion of said wheel mount frame member;
   at least one wheel carried by said wheel mount frame member;
   a belt attachment receptacle carried by said top frame member of said trailer frame;
   a belt attachment shaft telescopically extendable from said belt attachment receptacle;
   a belt attachment hook carried by said belt attachment shaft; and
   a load-stabilizing towing belt detachably engaging said belt attachment hook.

19. The pedestrian trailer of claim 18 further comprising a pivot bracket pivotally carried by said belt attachment shaft and wherein said belt attachment hook is carried by said pivot bracket.

20. The pedestrian trailer of claim 18 further comprising a belt attachment shaft selectively extendable from said trailer frame, a belt attachment hook pivotally carried by said belt attachment shaft, and a load-stabilizing towing belt removably engaging said belt attachment hook.

* * * * *